United States Patent
Rowley et al.

(10) Patent No.: US 8,094,941 B1
(45) Date of Patent: Jan. 10, 2012

(54) CHARACTER RECOGNITION FOR OVERLAPPING TEXTUAL USER INPUT

(75) Inventors: Henry A. Rowley, Sunnyvale, CA (US); Franz Och, Palo Alto, CA (US); Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/158,795

(22) Filed: Jun. 13, 2011

(51) Int. Cl.
*G06K 9/00* (2006.01)
(52) U.S. Cl. ......................... 382/187; 382/186
(58) Field of Classification Search ................ 382/187
See application file for complete search history.

(56) References Cited

U.S. PATENT DOCUMENTS

| | | | | |
|---|---|---|---|---|
| 5,272,470 | A | | 12/1993 | Zetts |
| 5,850,480 | A | * | 12/1998 | Scanlon ..................... 382/229 |
| 5,903,668 | A | * | 5/1999 | Beernink .................... 382/187 |
| 5,966,460 | A | * | 10/1999 | Porter et al. ................ 382/159 |
| 5,970,171 | A | * | 10/1999 | Baraghimian et al. ...... 382/187 |
| 6,292,857 | B1 | | 9/2001 | Sidoroff et al. |
| 6,340,967 | B1 | * | 1/2002 | Maxted ....................... 345/179 |
| 6,681,044 | B1 | * | 1/2004 | Ma et al. ..................... 382/185 |
| 7,409,090 | B2 | * | 8/2008 | Akiyama ..................... 382/187 |
| 7,480,411 | B1 | * | 1/2009 | Tzadok et al. ............... 382/182 |
| 7,627,177 | B2 | * | 12/2009 | Tzadok et al. ............... 382/182 |
| 7,752,561 | B2 | | 7/2010 | Yalovsky et al. |
| 7,865,018 | B2 | * | 1/2011 | Abdulkader et al. ....... 382/186 |
| 2004/0017946 | A1 | * | 1/2004 | Longe et al. ................. 382/185 |
| 2004/0141646 | A1 | | 7/2004 | Fahmy et al. |
| 2006/0274943 | A1 | * | 12/2006 | Abdulkader et al. ....... 382/186 |

OTHER PUBLICATIONS

"Nokia Diexie," [online]. Nokia 2011. Released Mar. 15, 2011. First accessed Nov. 4, 2011. Retrieved from the Internet: <http://betalabs.nokia.com/apps/nokia-diexie?req=true> (2 pgs.).

Jaeger et al., " NPEN++: An On-Line Handwriting Recognition System," Proceedings of the Seventh International Workshop on Frontiers in Handwriting Recognition, Sep. 11-13, 2000, Amsterdam, NL, pp. 249-260.

Macherey et al., "Lattice-based Minimum Error Rate Training for Statistical Machine Translation," Proceedings of the 2008 Conference on Empirical Methods in Natural Language Processing, Honolulu, HI, Oct. 2008, pp. 725-734.

Och, "Minimum Error Rate Training in Statistical Machine Translation," Proceedings of the 41st Annual Meeting of the Association for Computational Linguistics, Jul. 2003, pp. 160-167.

Jacobs et al., "Text Recognition of Low-resolution Document Images," Proceedings. Eighth International Conference on Document Analysis and Recognition, 2005, Aug. 29-Sep. 1, 2005, vol. 2. pp. 695-699.

* cited by examiner

*Primary Examiner* — Sath V Perungavoor
(74) *Attorney, Agent, or Firm* — Shumaker & Sieffert, P.A.

(57) ABSTRACT

Techniques described herein may recognize handwritten characters that are written at least partially over the top of one another that are input to a computing device. The handwritten characters may be formed of one or more strokes. A user may write characters or parts of words over approximately the same area of graphical user interface (i.e., on top of each other) without having to wait for a timeout between character input and without having to select a button or provide another input indicating the character is complete before entering input for another character. Once a character is at least partially recognized, a graphical indication corresponding to the user input displayed on a screen may be altered. Such alterations may include fading or changing size or location of the graphical indication.

19 Claims, 6 Drawing Sheets

CHARACTER RECOGNITION FOR OVERLAPPING TEXTUAL USER INPUT

TECHNICAL FIELD

The disclosure relates to character recognition for overlapping textual user input.

BACKGROUND

Users may often interact with computing devices such as mobile phones, personal data assistants (PDAs), desktop computers, signature pads, tablet computers, or other mobile devices via a touch-sensitive input devices, for example, touch-sensitive screens. Typical touch-sensitive screens (generally referred to herein as "touch screens") allow a user to input text via writing on the screen using, for example, a stylus or finger. Some touch screens, especially those in smaller devices, have a limited area in which to write. Typical character recognition software differentiates one character from another through redefining written characters so they are drawn in a single stroke, requiring a user to wait a timeout period before writing a second character, or using horizontal offset between characters.

SUMMARY

In one example, a method for recognizing characters is provided. The method comprises receiving touch-based input relating to a sequence of strokes at a touch-based interface of a computing device, wherein a first subset of the sequence of strokes corresponds to a first area of the touch-based interface and a second subset of the sequence of strokes corresponds to a second area of the touch-based interface that at least partially overlaps the first area. The method further comprises displaying a graphical representation of the first subset of the sequence of strokes on an output device coupled to the computing device and determining a confidence level that a first character approximately matches the first subset of the sequence of strokes, wherein the confidence level is of at least a first confidence threshold. The method also comprises altering the display of the graphical representation of the first subset of the sequence of strokes based on the confidence level and providing the first character for processing by an application executing on the computing device when the confidence level is of at least a second confidence threshold, wherein the application is designed to process characters from touch-based input.

In another example, a tangible computer-readable medium is provided that comprises instructions for causing a programmable processor to perform operations. The instructions may include receiving touch-based input relating to a sequence of strokes at a touch-based interface of a computing device, wherein a first subset of the sequence of strokes corresponds to a first graphical area of the touch-based interface and a second subset of the sequence of strokes corresponds to a second graphical area of the touch-based interface that at least partially overlaps the first graphical area. The instructions may also include displaying a graphical representation of the first subset of the sequence of strokes on an output device coupled to the computing device and determining that the first subset of the sequence of strokes corresponds to a first character by at least a first confidence threshold. The instructions may also include altering the graphical representation of the first subset of the sequence of strokes based on the determination that the first subset of the sequence of strokes corresponds to the first character. The instructions may include providing the first character for processing by an application executing on the computing device, wherein the application is designed to process characters from touch-based input.

In yet another example, a computing device comprising one or more processors is provided. The computing device may further comprise an input device to receive touch-based user input of a sequence of strokes related to textual information, wherein the sequence of strokes comprises a first subset of strokes corresponding to a first area of the input device and a second subset of strokes corresponding to a second area of the input device at least partially overlapping the first subset of strokes. The computing device may also comprise means for determining which strokes of the series of stroke fall into the first subset of the sequence of strokes and for determining that the first subset of the sequence of strokes corresponds to a first character. The computing device may further comprise an output device to display a graphical representation of the first subset of the sequence of strokes, wherein the output device alters the graphical representation based on the determination that the first subset of the sequence of strokes corresponds to the first character, wherein the output device further output the first character.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present disclosure. Like reference characters denote like elements throughout the figures and text.

DETAILED DESCRIPTION

Techniques of the present disclosure allow a computing device to recognize handwritten characters that are written at least partially over the top of one another. A user of the computing device inputs handwritten characters through input (e.g., touch input) formed of one or more strokes. A character may be any marking that conveys information, such as, but not limited to, letters, numbers, or other symbols.

A user may continuously write characters or parts of words over approximately the same area of the screen (i.e., on top of each other) without having to wait for a timeout between character input and without having to select a button or provide another input indicating the character is complete before entering input for another character. A graphical indication on the screen corresponding to the user input (referred to herein as "ink") may be displayed.

The computing device may have a character recognition module that automatically separates the characters from one another. Potentially recognized characters may have a confidence level that indicates the level of accuracy with which the potentially recognized character corresponds to the user input. Once a character is recognized with a confidence level above a first confidence threshold, the graphical representation of the user input corresponding to that recognized character may be displayed with a property indicating that the character was recognized from the user input (e.g., at least partially faded). Once a character is recognized with a confidence level above a second confidence threshold, the recognition module may generate, identify, or provide the character corresponding to that input for use by another application. When the character is recognized with a confidence level above the second confidence level, the graphical representation of the recognized character may be removed from the display. In some examples, the computing device displays those characters that are recognized as text. The techniques described herein may also be applied on a basis other than individual characters, such as words or sentences.

Figure 1:
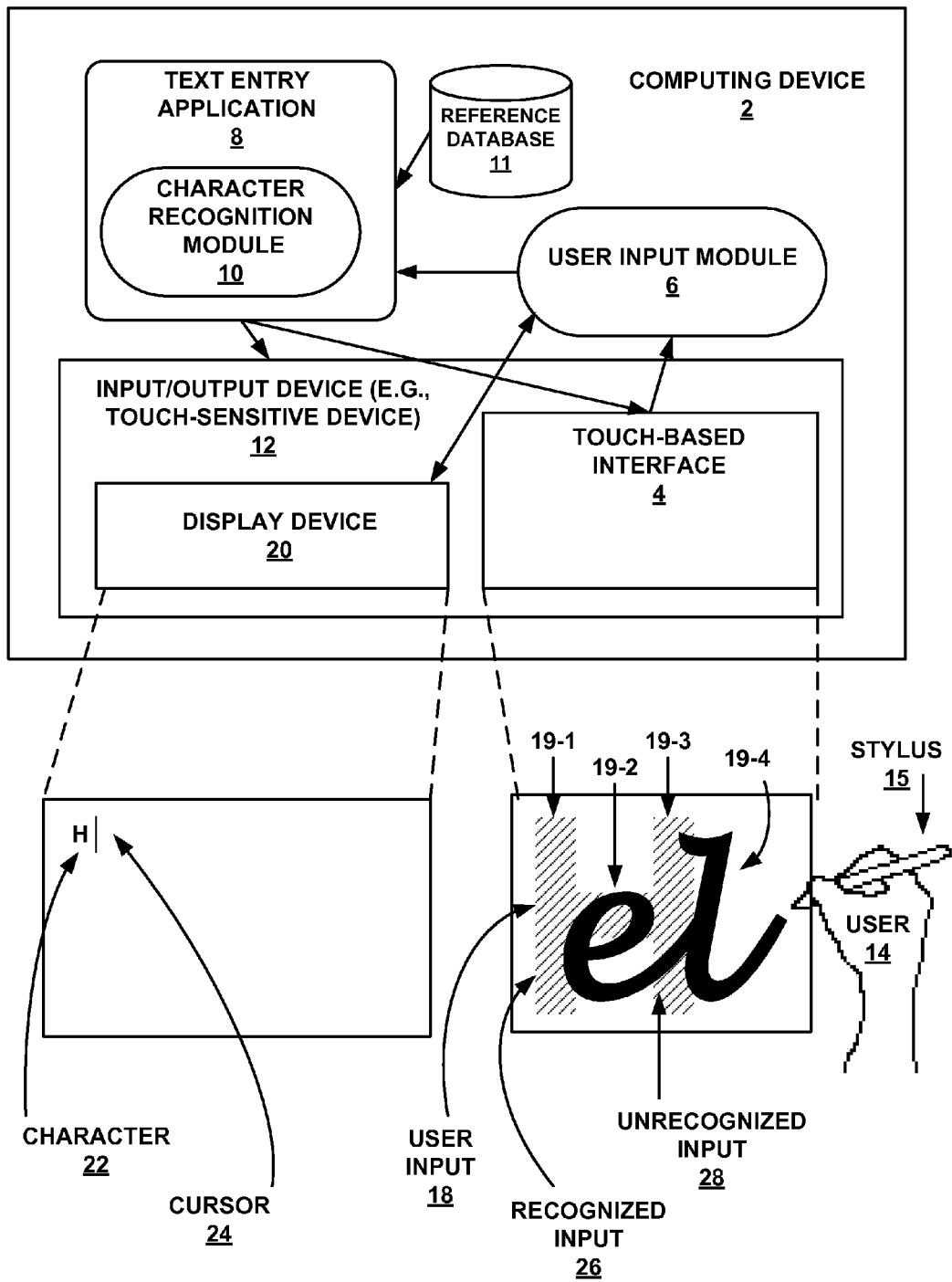
FIG. 1 is a block diagram illustrating an example of a computing device that may execute one or more applications and receive a user input, in accordance with one or more aspects of the present disclosure.

FIG. 1 is a block diagram illustrating an example of a computing device 2 that may execute one or more applications (e.g., text entry application 8) and receive a user input 18, in accordance with one or more aspects of the present disclosure. Computing device 2 may, in some examples, include, be, or be a part of a portable computing device (e.g., a mobile phone, netbook, laptop, personal data assistant (PDA), or tablet device) or a stationary computer (e.g., a desktop computer), or may be another computing device, such as a signature pad. Computing device 2 may also connect to a network including a wired or wireless network. One example of computing device 2 is more fully described in FIG. 2, discussed below.

Computing device 2 may include an input/output ("I/O") device 12 such as a presence-sensitive device capable of receiving user input 18 from a user 14, such as, for example, detecting gestures. In one example, I/O device 12 is a touch-sensitive device (e.g., touch screen, track pad, track point, or the like) capable of receiving user input 18 from user 14, wherein user input 18 is touch input. I/O device 12 may, in one example, generate one or more signals corresponding to the coordinates of a position touched on I/O device 12. These signals may be provided as information to components of computing device 2 (e.g., text entry application 8 in FIG. 1, processor 30, or operating system 44 in FIG. 2). I/O device 12 may also display or otherwise output (e.g., auditory) information to user 14. For example, I/O device 12 may display a character 22 or a cursor 24. I/O device 12 may in other examples display video or other graphical information. I/O device 12 may provide numerous forms of output information to user 14, which are further discussed in FIG. 2.

In some examples, I/O device 12 may comprise a touch-based interface 4 and a display device 20. In some examples, touch-based interface 4 and display device 20 may be integrated into a single device, for example, a touch screen. In another example, touch-based interface 4 and display device 20 may be separate devices, for example, touch-based interface 4 may be a touch pad or track point and display device 20 may be a liquid crystal display ("LCD").

User 14 may interact with I/O device 12, for example, a touch-sensitive screen, by performing user input 18 on I/O device 12. For example, user 14 may handwrite user input 18 onto the I/O device 12. When user 14 inputs handwriting, the user input 18 may be in print, cursive, or any other form of writing or drawing.

User input 18 may include one or more gestures performed by user 14. User 14 may perform user input 18 by placing one or more fingers or another implement, such as a stylus 15, in contact with I/O device 12, which may be a touch-sensitive screen. Stylus 15 may be any device that aids user 14 in handwriting on the touch-based interface 4. In one example, user 14 may move one or more fingers while in contact with touch-based interface 4. User input 18 may be handwritten and associated with a character from a natural language. Characters from a natural language may include numbers, letters, symbols, or other indicia capable of communicating meaning either independently or in combination with other characters. In one example, a set of characters contains characters from a natural language.

For example, user 14 may handwrite on touch-based interface 4 in one or more strokes. As used herein, a stroke may be any portion of a single, unbroken movement that is received by the touch-based interface 4. For illustrative purposes, strokes herein are described mostly in terms of single movements or single characters; however, it is to be understood that a stroke may be an entire movement or may be a fragment or portion of an entire movement, and may be a part of a character, a whole character, or more than one character. In the example of FIG. 1, user 14 begins to handwrite the word "Hello" on the touch-based interface 4. To do so, user 14 may handwrite a sequence of strokes 19-1 through 19-4 via the touch-based interface 4. User 14 handwrites a first stroke 19-1 for a vertical line corresponding to the left side of the "H," then begins a second stroke 19-2 for a horizontal bar for the "H." User 14 completes the "H" by writing the third stroke 19-3, which is another vertical line. Next, the user 14 writes stroke 19-4 for the "el" in "Hello." The "e" corresponds to a first portion of stroke 19-4 and the "l" corresponds to a second portion of stroke 19-4.

I/O device 12 may generate a signal corresponding to user input 18 that is transmitted to user input module 6. User input module 6 may process user input 18 received from user 14. In some cases, user input module 6 may perform additional processing of user input 18, such as, for example, converting user input 18 into more usable forms. In some examples, user input module 6 provides a signal to display device 20 to display a graphical representation of user input 18. For example, as user 14 writes strokes 19-1 through 19-4 on the touch-based interface 4, display device 20 displays ink corresponding to the user input 18. In some cases, user input module 6 may transmit a signal corresponding to user input 18 to an application, such as text entry application 8, or to another component in computing device 2. Text entry application 8 may be any application that accepts textual user input, such as, for example, a word processing application, an Internet browser, an application that may be controlled with textual user input, or the like. In some examples, user input module 6 may determine a duration of user input 18 or any duration between receiving one stroke and receiving another stroke. For example, input module 6 may measure the period of time between two strokes to distinguish between, for example, a single character and a word.

In some examples, text entry application 8 may include a character recognition module 10. Character recognition module 10 may perform a recognition operation on the signal corresponding to user input 18. The recognition operation may determine a character, for example, character 22, corresponding to at least a portion of user input 18. In one example, the recognition operation may analyze user input 18 to determine whether any portion of user input 18 corresponds to one or more characters. Character recognition module 10 may assign a score or ranking to potential character matches for a portion of user input 18. The score or ranking is a measure of how likely it is that a stroke or sequence of strokes corresponds to a particular character. Character recognition module 10 may select a character from the potential character matches based at least in part on the score or ranking, as well as other factors. In one example, character recognition module 10 may select a character corresponding to a portion of user input 18 when that character has a score above a selected threshold level. In some examples, character recognition module 10 may perform some or all of the functions of user input module 6. Some example methods of character recognition are described herein. In other examples, character recognition module 10 may additionally perform any method or have any feature of other character recognition operations and methods now known or later developed. The techniques described herein generally are discussed in terms of characters; however, the techniques described herein may also apply to words, sentences, or other groupings of characters. For example, character recognition module 10 may recognize one or more words that are partially overlapping other words or characters.

For example, character recognition module 10 may access reference database 11 when analyzing user input 18. Reference database 11 may contain a table of characters, a dictionary, and/or a grammar reference. For example, character recognition module 10 may perform a lookup in reference database 11 based at least in part on user input 18, where reference database 11 contains a table mappings characters with one or more strokes. In another example, character recognition module 10 may perform a lookup of a potential word in reference database 11 to assist recognizing a character based at least in part on that character's relationship to previously recognized characters. For example, if character recognition module 10 previously recognized five characters as O, R, A, N, and G, there is a higher probability that a sixth character is a letter E based on the "ORANG" preceding the sixth character, spelling "ORANGE." Therefore, character recognition module 10 may give the letter E a higher rank for the sixth character than the rank for other characters. Similarly, character recognition module 10 may use a grammar reference in reference database 11 to rank characters or words based at least partially on grammatical rules. Character recognition module 10 may further determine a character of a subset of strokes based on the relationship of that subset of strokes to another character (for example, the subset of strokes is the next letter in a word or is the next word of a sentence).

In the example of FIG. 1, character recognition module 10 has recognized strokes 19-1 through 19-3, shown as recognized input 26, corresponding to the letter "H." Character recognition module 10 may generate a signal corresponding to the recognized input 26 and provide it to text entry application 8 or to another component or module within computing device 2. For example, character recognition module 10 may provide text entry application 8 with a signal indicating that user 14 has inputted the letter "H." Text entry application 8 may generate a signal corresponding to the letter "H" for further processing by text entry application 8 or computing device 2. In one example, text entry application 8 displays recognized input 26 on display device 20. For example, display device 20 may display character 22 representing recognized input 26 at a location of cursor 24. Also, cursor 24 or any other text may be repositioned due to the addition of character 22.

In another example, character recognition module 10 instructs I/O device 12 to cease displaying and/or modify the display of any previously displayed graphical representation of recognized input 26. That is, display device 20 may alter the ink corresponding to recognized input 26 once character recognition module 10 recognizes that portion of user input 18. For example, the ink corresponding to recognized input 26 may fade out. In another example, display device 20 may display recognized input 26 in a different location, a different color, a different font, or may change font qualities (e.g., bold, underline, or italicize) or size, or may alter any other attribute of the ink once recognized input 26 is recognized (for example, display recognized input 26 as an outline). In other examples, older strokes may be slowly faded out with time, shifted off to the side, change in size, or otherwise change in order to clear display device 20 based at least in part on a confidence level that the strokes are accurately recognized. In one example, strokes that are recognized with a confidence level above at least a second threshold level are completely faded from display device 20.

In the example shown in FIG. 1, character recognition module 10 has not yet recognized another portion of user input 18, that is, unrecognized input 28. Display device 20 may display a graphical representation of unrecognized input 28 (for example, in ink). In one example, display device 20 may display unrecognized input 28 in a different style ink than recognized input 26 (for example, in a different color, different line thickness, different transparency, etc.). Once character recognition module 10 recognizes unrecognized input 28 by a least a first threshold confidence level, display device 20 may display unrecognized input 28 as recognized input 26 is displayed.

In one example, computing device 2 is a mobile device having a touch-based interface 4 with a limited graphical area. Techniques described herein enable user 14 to more efficiently use the touch-based interface 4 for handwritten user input. In other examples, computing device 2 is a desktop machine. In such examples, user 14 may input handwriting to provide, for example, input into a field of a web page.

Figure 2:
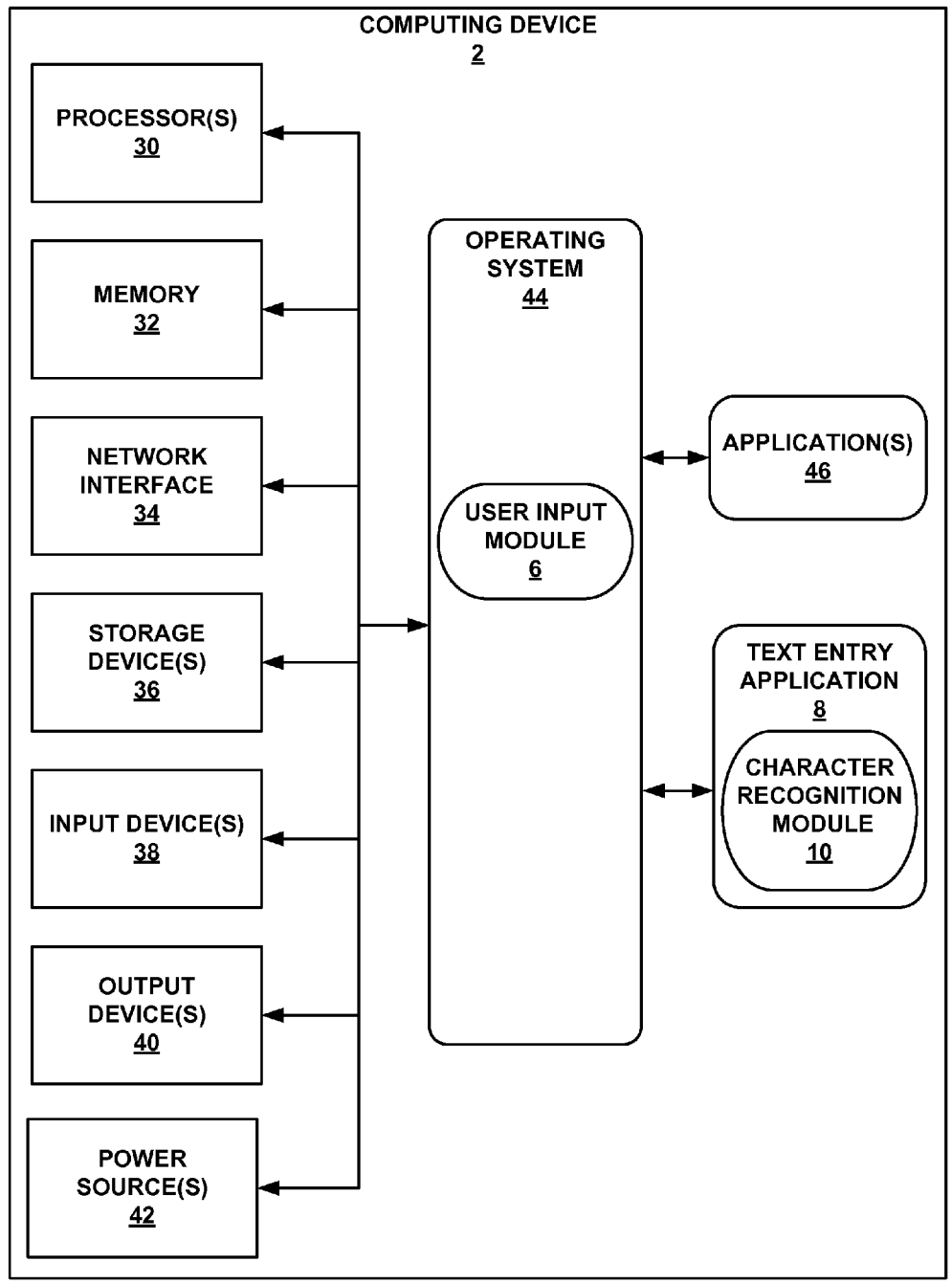
FIG. 2 is a block diagram illustrating further details of one example of the computing device shown in FIG. 1, in accordance with one or more aspects of the present disclosure.

FIG. 2 is a block diagram illustrating further details of one example of computing device 2 shown in FIG. 1. FIG. 2 illustrates only one particular example of computing device 2, and many other example embodiments of computing device 2 may be used in other instances.

As shown in the specific example of FIG. 2, computing device 2 includes one or more processors 30, memory 32, a network interface 34, one or more storage devices 36, one or more input devices 38, one or more output devices 40, and one or more batteries or other power sources 42. Computing device 2 also includes an operating system 44, which may include user input module 6 executable by computing device 2. Computing device 2 may include one or more applications 46 and text entry application 8, which may include character mapping module 10 executable by computing device 2. Operating system 44, application 46 and text entry application 8 are also executable by computing device 2. Each of components 30, 32, 34, 36, 38, 40, 42, 44, 46, 6, 8, and 10 may be interconnected (physically, communicatively, and/or operatively) for inter-component communications.

Processors 30 may be configured to implement functionality and/or process instructions for execution in computing device 2. Processors 30 may be capable of processing instructions stored in memory 32 or instructions stored on storage devices 36.

Memory 32 may be configured to store information within computing device 2 during operation. Memory 32 may, in some examples, be described as a non-transitory or tangible computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 46) to temporarily store information during program execution.

Storage devices 36 may also include one or more non-transitory or tangible computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes a network interface 34. Computing device 2 may utilize network interface 34 to communicate with external devices via one or more networks, such as one or more wireless networks. Network interface 34 may be a network interface card, such as an Ethernet card, an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 2 may utilize network interface 34 to wirelessly communicate with an external device (not shown) such as a server, mobile phone, or other networked computing device.

Computing device 2 may also include one or more input devices 38. Input device 38 may be configured to receive input from a user through tactile, audio, or video input. Examples of input device 38 may include a touch-sensitive screen, mouse, a keyboard, a voice responsive system, video camera, or any other type of device for detecting a command from a user.

One or more output devices 40 may also be included in computing device 2, e.g., I/O device 12. Output device 40 may be configured to provide output to a user using tactile, audio, or video output. Output device 40 may include a touch-sensitive screen, sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can provide output to a user.

Computing device 2 may include one or more batteries or power sources 42, which may be rechargeable and provide power to computing device 2. One or more power sources 42 may be a battery made from nickel-cadmium, lithium-ion, or any other suitable material. The one or more power sources 42 may be rechargeable and/or the device 2 can be powered via a power supply connection.

Computing device 2 may include operating system 44. Operating system 44 may control the operation of components of computing device 2. For example, operating system 44 may facilitate the interaction of application 46 or text entry application 8 with processors 30, memory 32, network interface 34, storage device 36, input device 38, output device 40, and battery 42.

Operating system 44 may additionally include user input module 6. User input module 6 may be executed as part of operating system 44. In other cases, user input module 6 may be implemented or executed by computing device 2. User input module 6 may process input, e.g., user input 18 received from user 14 through one or more input devices 38. Alternatively, user input module 6 may receive input from a component such as processors 30, memory 32, network interface 34, storage devices 36, one or more output devices 40, battery 42, or operating system 44. In some cases, user input module 6 may perform additional processing on user input 18. In other cases, user input module 6 may transmit input to an application, e.g. application 46 or text entry application 8, or other component in computing device 2.

Any applications, e.g. application 46 or text entry application 8, implemented within or executed by computing device 2 may be implemented or contained within, operable by, executed by, and/or be operatively/communicatively coupled to components of computing device 2, e.g., processors 30, memory 32, network interface 34, and/or storage devices 36. In one example, character recognition module 10 is executed on a server physically separate from computing device 2, and connected to computing device 2 by a network connection via network interface 34.

Figure 3:
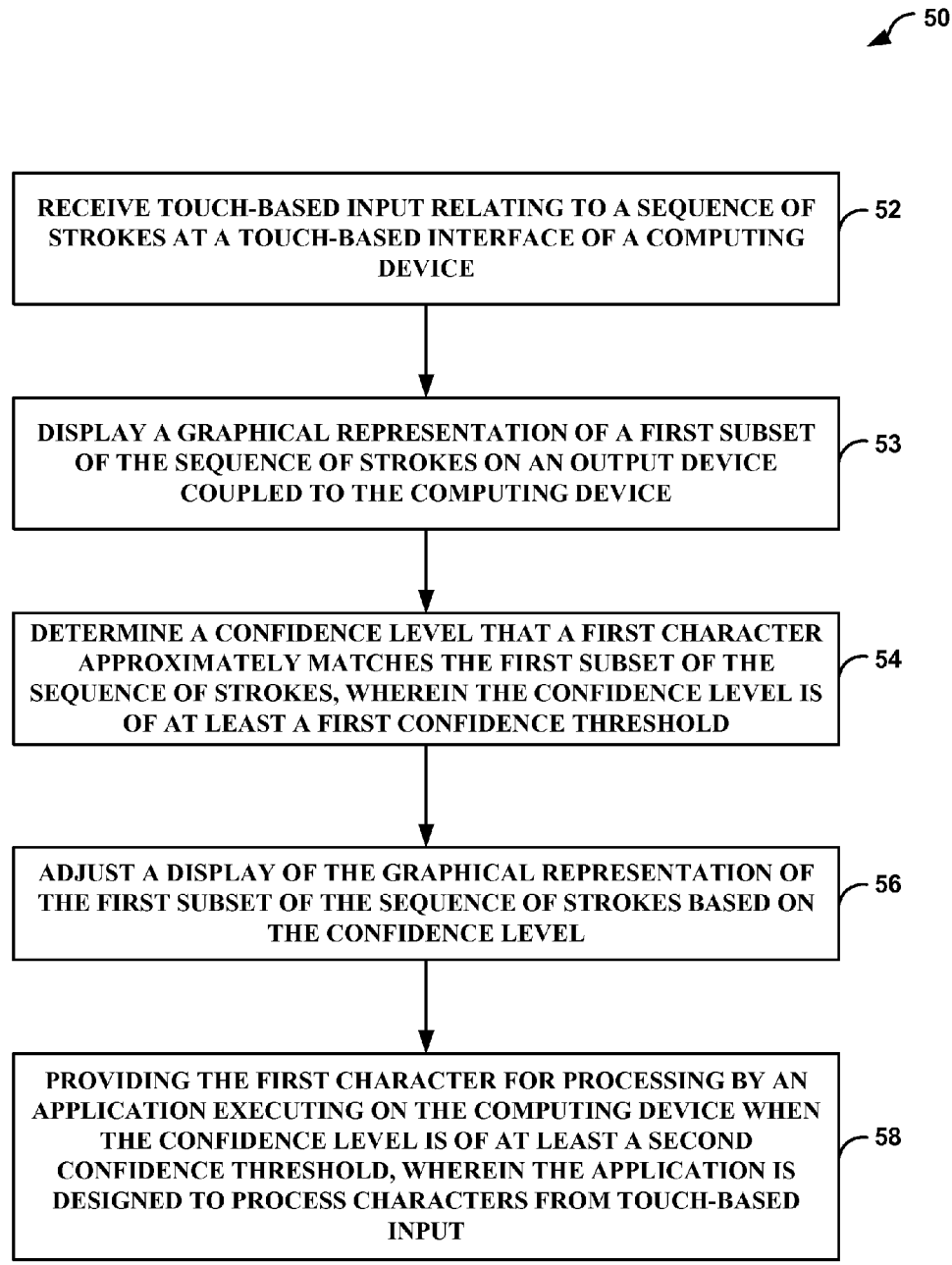
FIG. 3 is a flow chart illustrating an example method that may be performed by a computing device to recognize a character corresponding to a touch input, in accordance with one or more aspects of the present disclosure.

FIG. 3 is a flow chart illustrating an example method 50 that may be performed by a computing device to recognize a character corresponding to a touch input, in accordance with one or more aspects of the present disclosure. For example, method 50 may be performed by computing device 2 shown in FIG. 1 or 2.

Method 50 includes receiving touch-based input relating to a sequence of strokes at a touch-based interface of a computing device, wherein a first subset of the sequence of strokes corresponds to a first graphical area of the touch-based interface and a second subset of the sequence of strokes corresponds to a second graphical area of the touch-based interface that at least partially overlaps the first graphical area (52). These strokes will be discussed in greater detail below with respect to FIGS. 4 and 5. Method 50 further includes displaying a graphical representation of the first subset of the sequence of strokes on an output device coupled to the computing device (53).

Method 50 further includes determining a confidence level that a first character approximately matches the first subset of the sequence of strokes, wherein the confidence level is of at least a first confidence threshold (54). For example, character recognition module 10 may analyze the first subset of the sequence of strokes to determine whether the first subset of strokes corresponds to a potential character. Character recognition module 10 may compare the first subset of strokes to a set of characters, for example, stored in reference database 11, and assign a rank or score for each character or for a subset of the set of characters based at least in part on how likely the character matches the first subset of strokes, wherein the rank or score is related to the confidence level.

In one example, character recognition module 10 may determine a measure of congruence with a first character. For example, when the shape of the first character approximately matches the shape of the first subset of strokes, the first character may be ranked or scored relatively highly for congruence over less congruent characters. When the shape of a second character does not approximately match the shape of the first subset of strokes, the second character may not be ranked or scored highly for congruence. In this example, the first character may be given a higher ranking or score than the second character as a potential match for the first subset of strokes.

Method 50 may further include adjusting a display of the graphical representation (e.g., partially fading the graphical representation) of the first subset of the sequence of strokes based on the confidence level (56). In one example, the graphical representation of the first subset of the sequence of strokes may be adjusted to a greater extent based on greater a confidence level. In another example, the graphical representation may not be faded until the confidence level that the first character corresponds to the first subset of the sequence of strokes is at least equal to or above a first confidence threshold. In one example, fading the graphical representation based on the confidence level aids in clearing the output device for additional user input. In one example, fading may be performed at a word level, for example, an entire word may be faded as a group. In some examples, fading may be determined based on a timeout period (e.g., strokes are faded a specific time after entry). In some examples, a first stroke may be faded once a threshold number of strokes has been input after the first stroke.

Method 50 may also include providing the first character for processing by an application executing on the computing device when the confidence level is of at least a second confidence threshold, wherein the application is designed to process characters from touch-based input (58). In one example, the second confidence threshold is a selected threshold that indicates that a first sequence of strokes corresponds to the first character. In one example, the second confidence threshold may indicate a higher accuracy than the first confidence threshold. In another example, the second confidence threshold may be approximately equal to the first confidence threshold.

Other factors that character recognition module 10 may use to recognize user input 18 include vertical spacing between two strokes (e.g., a distance between two strokes in a first direction), horizontal spacing between two strokes (e.g., a distance between two strokes in a second direction orthogonal to the first direction), horizontal or vertical positioning of a stroke (e.g., where a stroke is located on a touch screen), crossing of strokes (e.g., where one stroke intersects another), the number of strokes in a subset of strokes, chronological order in which the strokes were inputted, a combination of different characters in a single stroke, previously recognized characters, words, or sentences, or any other suitable factor used in character recognition. Furthermore, segmentation of strokes may be based on any of the above enumerated factors. For example, when user 14 starts writing at a first side of touch-based interface 4 and reaches the opposite side, and then starts writing again on the first side, the overlap with strokes on the first side may indicate segmentation between characters.

Character recognition module 10 may select a character based at least in part on any number of the foregoing factors. In one example, character recognition module 10 may assign a weight to each factor and may selected a character based at least in part on a weighted average of the factors. In one example, character recognition module 10 or other application in computing device 2 may use minimum error rate training ("MERT") to assign or modify a weight of a particular factor. MERT is a method used to estimate weights assigned in a linear model such that an automated evaluation criterion for measuring system performance can directly be optimized in training In other words, computing device 2 may use MERT to improve the accuracy of handwriting recognition of user 14 as user 14 uses computing device 2. In one example, partially fading strokes based on their confidence level may aid user 14 in training the character recognition module 10. In some examples, MERT techniques are applied to computing device 2 in a training mode of computing device 2. In other examples, MERT techniques are applied as user 14 enters user input 18. Any corrections user 14 makes to the characters recognized by character recognition module 10 may be used to improve the accuracy of character recognition module 10.

Once a character is recognized, method 50 may identify or provide the first character for processing by an application executing on the computing device, wherein the application is designed to process characters from touch-based input (56). For example, character recognition module 10 generates a signal corresponding to the first character for processing by text entry application 8, for example, displaying the first character at cursor 24. In another example, text entry application 8 may use the signal corresponding to the first character as a control input.

Figure 4:
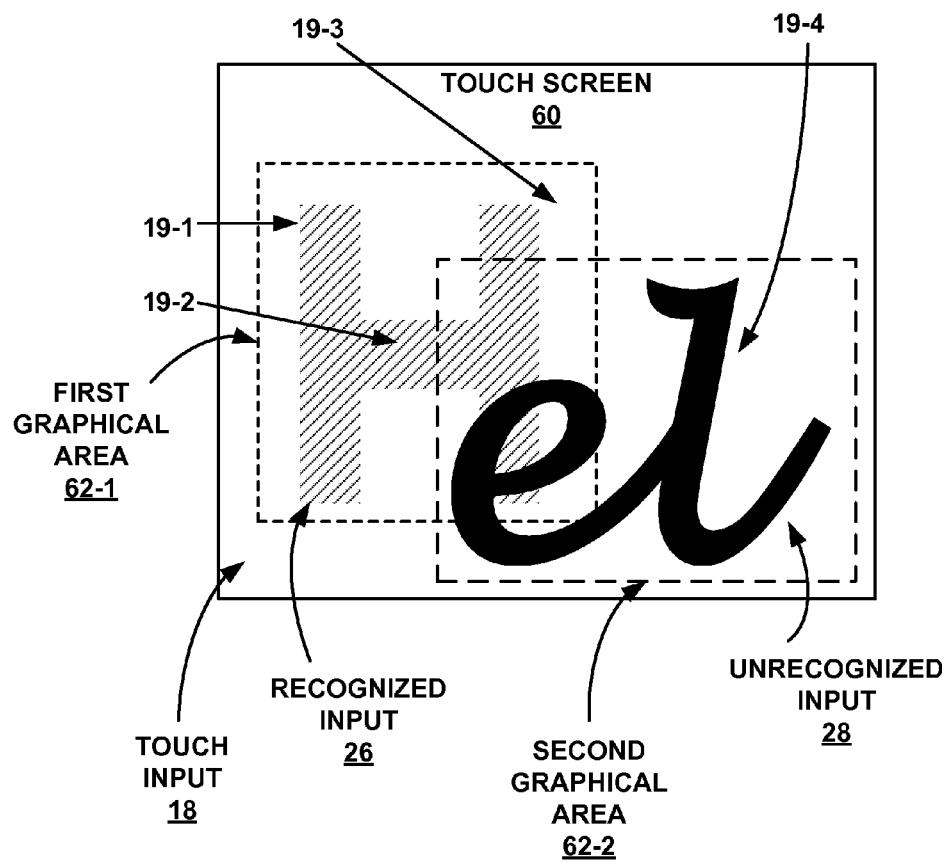
FIG. 4 is a conceptual diagram illustrating one example of a sequence of strokes of touch-based input that may be recognized by a computing device executing a character recognition module, in accordance with one or more aspects of the present disclosure.

FIG. 4 is a conceptual diagram illustrating one example of a sequence of strokes of touch-based input 19-1 through 19-4 that may be recognized by a computing device executing a character recognition module, in accordance with one or more aspects of the present disclosure. For example, user 14 handwrote the sequence of strokes 19-1 through 19-4 using touch screen 60 of computing device 2. Touch screen 60 may display a graphical representation of the sequence of strokes 19-1 through 19-4.

The sequence of strokes 19-1 through 19-4 may have been entered in chronological order from stroke 19-1 to stroke 19-4. As shown in FIG. 4, user 14 may have written the letter "H" as a first subset of the sequence of strokes, that is, strokes 19-1 through 19-3, in a first graphical area 62-1 of touch screen 60. User 14 may continue writing over the top of the first subset of the sequence of strokes, for example, stroke 19-4 overlaps stroke 19-3. Stroke 19-4 is written in a second graphical area 62-2 of the touch screen 60, wherein the second graphical area 62-2 overlaps the first graphical area 62-1. Character recognition module 10 may recognize characters inputted by user 14 despite at least a portion of the characters overlapping each other. This allows user 14 to reuse areas of touch screen 60 without waiting for character recognition module 10 to recognize previously written strokes.

Character recognition module 10 may instruct display device 20 to alter the display of a subset of strokes (e.g., fade the display of the subset of strokes) based at least in part on a probability of an accurate determination. For example, the more likely the subset of strokes is accurately recognized, the lighter the shade of an ink display. In one example, once character recognition module 10 determines a subset of strokes corresponds to a character having a ranking or score above a threshold confidence level, display device 20 stops displaying those strokes (for example, the strokes corresponding to the recognized character may fade out completely).

Character recognition module 10 may also detect two or more characters in a single stroke, such as unrecognized input 28. Character recognition module 10 may determine a boundary between one character and another when user input 18 connects the characters (for example, in cursive handwriting).

For example, character recognition module 10 may differentiate between the "e" and the "l" in stroke 19-4 based at least in part on techniques described herein.

FIGS. 5A-5D are conceptual diagrams illustrating one example of a sequence of strokes 70 inputted by a user that may be analyzed by a character recognition module, in accordance with one or more aspects of the present disclosure. In the example shown in FIGS. 5A-5D, a user 14 wrote "Hello" in the form of the sequence of strokes 70, which includes strokes 70-1 through 70-9. In FIGS. 5A-5D, strokes 70 are shown having horizontal offset for clarity; however, it is to be understood that some of strokes 70-1 through 70-9 may be written on top of other strokes 70-1 through 70-9 (that is, some of strokes 70-1 through 70-9 may overlap).

In one example, character recognition module 10 may consider different subsets of the sequence of strokes 70 to determine which characters user 14 intended to input. For example, user 14 chronologically inputs the sequence of strokes 70 to computing device 2 via touch-based interface 4. FIGS. 5A-5D illustrate one example of how character recognition module 10 may determine which strokes are in a first subset of strokes based at least in part on reviewing different chronological subsets of strokes until a character is recognized from the strokes within that subset.

Figure 5A:
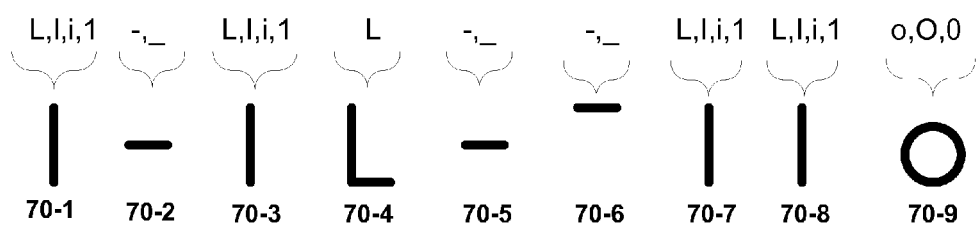
FIGS. 5A-5D are conceptual diagrams illustrating one example of a sequence of strokes inputted by a user that may be analyzed by a character recognition module, in accordance with one or more aspects of the present disclosure.

In FIG. 5A, character recognition module 10 may consider each stroke 70-1 through 70-9 individually. That is, a subset of the sequence of strokes 70 contains a single stroke. Character recognition module 10 may look at each stoke 70-1 through 70-9 and assign a score for each approximate match to a character. For example, character recognition module 10 may find an approximate match for strokes 70-1, 70-3, 70-7, and 70-8 in capital and lower case of the letters "L" and "I," as well as the number 1. In such an example, without any prior user input 18 recognized, character recognition module 10 may assign a score or ranking to the potential matches based at least in part on the sequence of stokes 70-1 through 70-9. In examples having previously recognized characters, character recognition module 10 may additionally assign scores based at least in part on the previously recognized characters.

Additionally, for example, character recognition module 10 considers strokes 70-2, 70-5, and 70-6 to potentially be a dash "-" or underscore "_" and may rank these potential results accordingly. However, in some examples, because of stroke 70-6's relatively high vertical placement, character recognition module 10 may give "_" a relatively low score. Stroke 70-4 may be approximately matched as the capital letter "L" and assigned a high ranking Likewise, stroke 70-9 may be a capital or lowercase letter "O" or number "0."

Character recognition module 10 may rank or score these potential matches based on their likelihood of accurately matching one or any of the characters (for example, based on previous or subsequent subsets of strokes, vertical positioning, size, etc.). A high ranking may be a ranking that shows the character is more likely to be the intended character than a baseline or average. Comparatively, a low ranking may be a ranking that shows the character is less likely to be the intended character than the baseline or average.

Figure 5B:
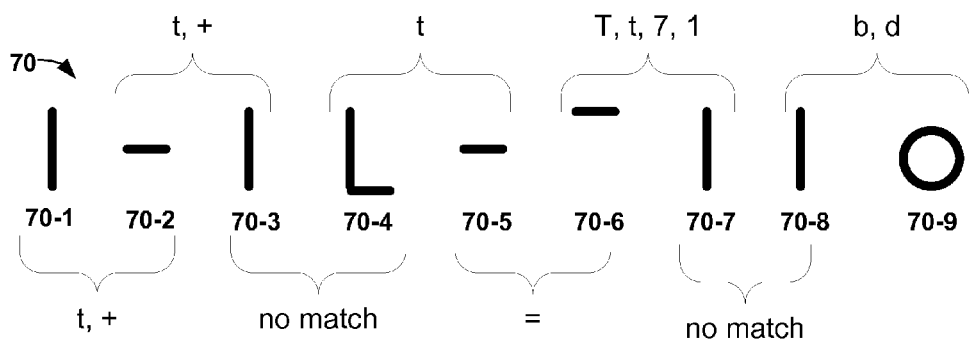

Character recognition module 10 may also consider subsets of strokes 70 having two strokes, as in FIG. 5B. In some examples, the subsets of strokes 70 contain consecutive strokes (that is, strokes that occurred next to each other in chronological order). In other examples, the subsets of strokes 70 contain strokes that are not consecutive (for example, a subset of strokes corresponding to a letter "i" may not be consecutive, as user 14 may dot the "i" after completing other letters of a word). For illustrative purposes, FIGS. 5A-5D show subsets of strokes 70 containing consecutive strokes.

Character recognition module 10 may consider the combination of each stroke in the subset of strokes as a single character. For example, in FIG. 5B, a subset of strokes 70 containing strokes 70-2 and 70-3, as well as 70-3 and 70-4, may potentially be the letter "t" or the symbol "+," and may be ranked or scored by character recognition module 10. Some subsets of strokes 70, for example, 70-3 and 70-4, as well as 70-7 and 70-8, may not have a potential match. In such an example, those subsets of strokes are assigned a low ranking or score, or none at all.

Figure 5C:
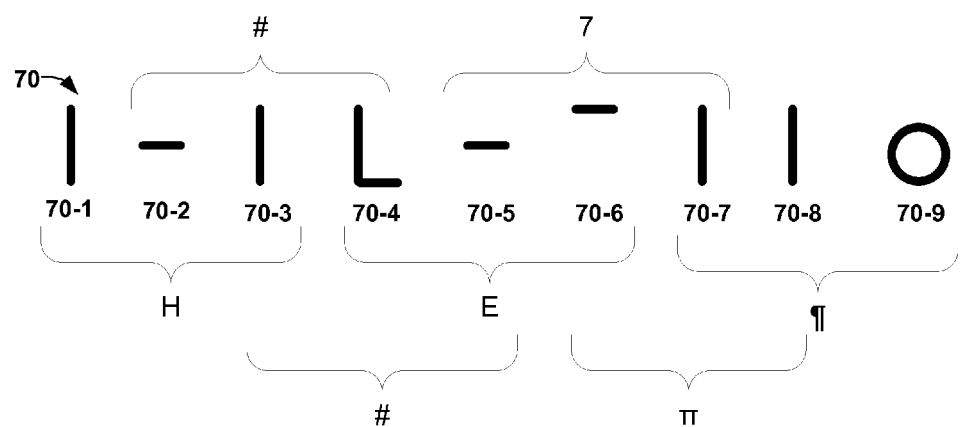

FIG. 5C shows an example of the subsets of strokes containing three consecutive strokes. In this example, character recognition module 10 recognizes strokes 70-1 through 70-3 as potentially being a letter "H." This recognition may be based on comparing the subset of strokes to a database of characters, or may be performed in another way. Therefore, the letter "H" may be given a high score or ranking for this subset of strokes. Similarly, strokes 70-4 through 70-6 correspond to a letter 'E' and may be scored or ranked accordingly. Once character recognition module 10 determines that a subset of strokes may be an "E," character recognition module 10 may use that information to re-rank or re-score previously ranked or scored characters. For example, character recognition module 10 may give "H" a higher ranking or score once "E" is detected. Character recognition module 10 may increase the ranking of "H" because character recognition module 10 may consult a database containing a dictionary which lists words beginning with "he."

Figure 5D:
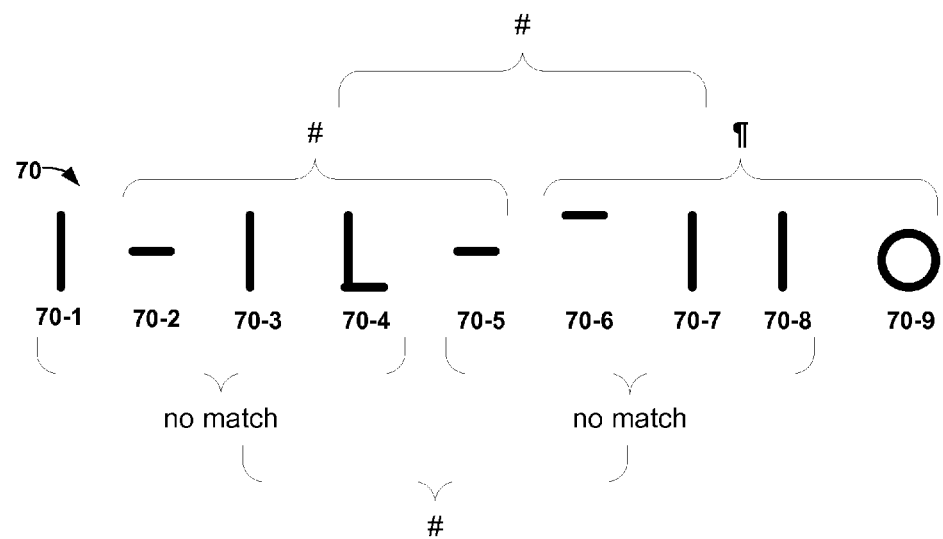

Likewise, FIG. 5D shows an example where the subsets of strokes 70 contain four consecutive strokes. In some examples, character recognition module 10 may have a threshold number of strokes that may be considered for a character. In the example of FIG. 5D, character recognition module 10 may set a threshold level of the number of strokes at four. This may be because as the number of strokes in a subset increases, the likelihood that subset matches a particular character decreases. In this example, character recognition module 10 may not find any high ranking character matches.

Character recognition module 10 may consider some or all of the subsets of strokes and their corresponding matches' rankings or scores in recognizing user 14's input. For example, based on various factors, character recognition module 10 may compare subsets with each other, as well as potential character matches within a subset. In some examples, character recognition module 10 maintains at least up to a maximum number of potential matches (for example, character recognition module 10 stores twenty most probable potential matches for each subset of strokes). In other examples, a maximum number of potential matches may be another number.

In one example, character recognition module 10 may compare different scores or rankings of subsets for particular characters, and select as the matching character that character which has the highest score for that subset or character with a score above a selected threshold level. In another example, character recognition module 10 may access a dictionary or grammar reference to identify and/or suggest a word based at least in part on a determined sequence of characters. In one example, the character recognition module 10 determines that user input 18 in FIGS. 5A-5D is the word 'Hello.'

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory or tangible media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

The invention claimed is:

1. A method for recognizing characters, comprising:
receiving touch-based input relating to a sequence of strokes at a touch-based interface of a computing device, wherein a first subset of the sequence of strokes corresponds to a first area of the touch-based interface and a second subset of the sequence of strokes corresponds to a second area of the touch-based interface that at least partially overlaps the first area;
displaying a graphical representation of the first subset of the sequence of strokes on an output device coupled to the computing device;
determining a confidence level that a first character approximately matches the first subset of the sequence of strokes, wherein the confidence level is of at least a first confidence threshold,
  wherein determining the confidence level further comprises comparing a graphical representation of the first subset of the sequence of strokes to one or more characters of a set of characters, further comprising comparing at least one property of the first subset of the sequence of strokes with a corresponding property of the one or more characters,
    wherein the at least one property includes one of congruency between the graphical representation of the first subset and the one or more characters, vertical spacing of strokes, horizontal spacing of strokes, crossing of strokes, size of strokes, and number of strokes;
altering the display of the graphical representation of the first subset of the sequence of strokes based on the confidence level; and
providing the first character for processing by an application executing on the computing device when the confidence level is of at least a second confidence threshold, wherein the application is designed to process characters from touch-based input.

2. The method of claim 1, wherein altering the display of the graphical representation of the first subset of the sequence of strokes further comprises:
ceasing to display the graphical representation of the first subset of the sequence of strokes when the confidence level is of at least the second confidence threshold.

3. The method of claim 1, wherein determining the confidence level that the first character approximately matches the first subset of the sequence of strokes further comprises:
ranking the one or more characters based at least on the comparison of the graphical representation to the one or more characters, wherein the rank is related to the confidence level; and
selecting the one or more characters as the first character based at least in part on the rank.

4. The method of claim 3, wherein ranking is based at least in part on how closely the graphical representation matches the one or more characters.

5. The method of claim 1, wherein ranking the one or more characters based at least on the comparison further comprises:
calculating a weighted average of the at least one property and at least a second property, wherein a weight applied to the one or more properties is determined using minimum error rate training.

6. The method of claim 1, further comprising:
determining that the second subset of the sequence of strokes corresponds to a second character; and
generating the second character for processing by the application.

7. The method of claim 6, further comprising:
displaying the first character at a first location in a textual display; and
displaying the second character at a second location in the textual display, wherein the second location is based in part on a relationship between the first character and the second character.

8. The method of claim 1, wherein the first area is approximately the same as the second area.

9. The method of claim 1, wherein determining the confidence level that the first character approximately matches the first subset of the sequence of strokes further comprises:

arranging the sequence of strokes into a chronological order based at least on when at least one stroke of the sequence of strokes was received at the touch-based interface;

selecting at least a first stroke and comparing at least the first stroke to one or more characters; and ranking the one or more characters based at least in part on the comparison between the first stroke and the one or more characters.

10. The method of claim 9, further comprising:

selecting the first character from the one or more characters based at least on the ranking of the one or more characters.

11. The method of claim 9, further comprising:

selecting at least the first stroke and at least a second stroke consecutive with the first stroke and comparing a combination of the first and second strokes to the one or more characters; and ranking the one or more characters based at least on the comparison of the one or more characters with the combination of the first and second strokes.

12. The method of claim 11, further comprising:

comparing at least one ranking corresponding to the first stroke with at least one ranking corresponding to the combination of the first and second strokes;

selecting one of at least the first stroke or the combination of the first and second strokes to be the subset of the sequence of strokes based at least in part on the comparison.

13. The method of claim 1, wherein determining the confidence level that the first character approximately matches the first subset of the sequence of strokes further comprises:

ranking the first character based at least in part on a determined character, wherein the ranking is related to the confidence level; and selecting the first character when the ranking is above a selected threshold level.

14. The method of claim 13, wherein ranking the first character based at least in part on previously determined characters further comprises:

checking a combination of the first character and the determined character against a language reference; and providing a rank to the first character based at least in part on approximate matches of the combination of the first character and the previously determined characters found in the language reference.

15. The method of claim 1, further comprising:

determining which strokes of the sequence of strokes to include in the first subset of the sequence of strokes based at least in part on vertical positions of the strokes within the touch-based interface, timing information relating to when the strokes were received, vertical spacing between the strokes, and horizontal spacing between the strokes.

16. The method of claim 15, wherein the first subset of strokes contains less than or equal to a threshold level of number of strokes.

17. The method of claim 1, wherein altering the display of the graphical representation of the first subset of the sequence of strokes further comprises:

fading the display of the graphical representation of the first subset of the sequence of strokes.

18. A tangible non-transitory computer-readable medium comprising instructions for causing a programmable processor to perform operations comprising:

receiving touch-based input relating to a sequence of strokes at a touch-based interface of a computing device, wherein a first subset of the sequence of strokes corresponds to a first graphical area of the touch-based interface and a second subset of the sequence of strokes corresponds to a second graphical area of the touch-based interface that at least partially overlaps the first graphical area;

displaying a graphical representation of the first subset of the sequence of strokes on an output device coupled to the computing device;

comparing a graphical representation of the first subset of the sequence of strokes to one or more characters of a set of characters, wherein comparing further comprises:

comparing at least one property of the first subset of the sequence of strokes with a corresponding property of the one or more characters, wherein the at least one property includes one of congruency between the graphical representation of the first subset and the one or more characters, vertical spacing of strokes, horizontal spacing of strokes, crossing of strokes, size of strokes, and number of strokes;

determining that the first subset of the sequence of strokes corresponds to a first character by at least a confidence threshold based on the comparison;

altering the graphical representation of the first subset of the sequence of strokes based on the determination that the first subset of the sequence of strokes corresponds to the first character; and providing the first character for processing by an application executing on the computing device, wherein the application is designed to process characters from touch-based input.

19. A computing device, comprising:

one or more processors;

an input device to receive touch-based user input of a sequence of strokes related to textual information, wherein the sequence of strokes comprises a first subset of strokes corresponding to a first area of the input device and a second subset of strokes corresponding to a second area of the input device at least partially overlapping the first subset of strokes;

means for determining which strokes of the sequence of strokes fall into the first subset of the sequence of strokes;

means for comparing at least one property of a graphical representation of the first subset of the sequence of strokes to a graphical representation of one or more characters of a set of characters, wherein the at least one property includes one of congruency between the graphical representation of the first subset and the one or more characters, vertical spacing of strokes, horizontal spacing of strokes, crossing of strokes, size of strokes, and number of strokes;

means for determining that the first subset of the sequence of strokes corresponds to a first character based on the comparison; and an output device to display a graphical representation of the first subset of the sequence of strokes, wherein the output device alters the graphical representation based on the determination that the first subset of the sequence of strokes corresponds to the first character and wherein the output device further outputs the first character.

* * * * *